(12) United States Patent
Al et al.

(10) Patent No.: US 9,640,984 B2
(45) Date of Patent: May 2, 2017

(54) CURRENT LIMITING DEVICE, CURRENT LIMITER AND CURRENT LIMITING SYSTEM FOR POWER GRID

(71) Applicants: Shaogui Al, Ningxia (CN); Chuan Wang, Hefei (CN); Yongning Huang, Ningxia (CN); Yiping Fan, Ningxia (CN); Guoyong Zhang, Hefei (CN); Yanjun Li, Hefei (CN); Ning Pan, Hefei (CN); Shuang Zhang, Ningxia (CN)

(72) Inventors: Shaogui Al, Ningxia (CN); Chuan Wang, Hefei (CN); Yongning Huang, Ningxia (CN); Yiping Fan, Ningxia (CN); Guoyong Zhang, Hefei (CN); Yanjun Li, Hefei (CN); Ning Pan, Hefei (CN); Shuang Zhang, Ningxia (CN)

(73) Assignees: STATE GRID NINGXIA ELECTRIC POWER TECHNICAL RESEARCH INSTITUTE, Yinchuan, Ningxia (CN); ANHUI HUIDIAN SCIENCE AND TECHNOLOGY CO., LTD., Beijing (CN)

( * ) Notice: Subject to any disclaimer, the term of this patent is extended or adjusted under 35 U.S.C. 154(b) by 27 days.

(21) Appl. No.: 14/441,918

(22) PCT Filed: Jan. 9, 2013

(86) PCT No.: PCT/CN2013/070279
§ 371 (c)(1),
(2) Date: May 11, 2015

(87) PCT Pub. No.: WO2014/107854
PCT Pub. Date: Jul. 17, 2014

(65) Prior Publication Data
US 2015/0318688 A1 Nov. 5, 2015

(51) Int. Cl.
*H02H 9/02* (2006.01)

(52) U.S. Cl.
CPC .............. *H02H 9/02* (2013.01); *H02H 9/021* (2013.01)

(58) Field of Classification Search
CPC .................................. H02H 9/02; H02H 9/021
See application file for complete search history.

(56) References Cited

U.S. PATENT DOCUMENTS 5,272,462 A * 12/1993 Teyssandier ........ H02J 13/0089
340/12.32
5,650,901 A * 7/1997 Yamamoto ............. H01H 9/542
361/100

(Continued)

FOREIGN PATENT DOCUMENTS

CN         101702517 A      5/2010
CN         201562957 U      8/2010
(Continued)

*Primary Examiner* — Stephen W Jackson
*Assistant Examiner* — Christopher Clark
(74) *Attorney, Agent, or Firm* — Fraser Clemens Martin & Miller LLC; James D. Miller (57) ABSTRACT

A current limiting device for a power grid includes a first current limiting reactor; a first smart fast switch connected with the first current limiting reactor in parallel; a current transformer sleeved on a bus bar located on one side of a circuit resulting from the parallel connection of the first current limiting reactor with the first smart fast switch to monitor the current in the bus bar in real time; and a controller connected with the current transformer to control the switch-off of the first smart fast switch when the current in the bus bar is higher than a first preset value and the switch-on of the first smart fast switch when the current in the bus bar is smaller than a second preset value, wherein the (Continued)

first preset value is higher than the second preset value. The current limiting device improves the operational reliability of a power grid.

9 Claims, 6 Drawing Sheets

(56) References Cited

U.S. PATENT DOCUMENTS

| | | | | |
|---|---|---|---|---|
| 5,883,774 A * | 3/1999 | Kida | ................... | H02H 9/08 361/47 |
| 2010/0149707 A1* | 6/2010 | Folts | ................ | H01B 12/02 361/58 |
| 2011/0308078 A1* | 12/2011 | Murphy | ................ | H02H 9/02 29/825 |
| 2012/0200971 A1* | 8/2012 | Darmann | ............ | H02H 9/021 361/93.9 |
| 2014/0005053 A1* | 1/2014 | Schacherer | ......... | H01F 38/023 505/211 |

FOREIGN PATENT DOCUMENTS

| | | |
|---|---|---|
| CN | 103023000 A | 4/2013 |
| CN | 203056563 U | 7/2013 |

\* cited by examiner

CURRENT LIMITING DEVICE, CURRENT LIMITER AND CURRENT LIMITING SYSTEM FOR POWER GRID

FIELD OF THE INVENTION

The disclosure relates to the electrical field and more particularly to a current limiting device, a current limiter and a current limiting system for a power grid.

BACKGROUND OF THE INVENTION

With the development of power grids, the maximum short-circuit currents of the power grids in many regions have exceeded the interrupting capacity (63 kA at most, currently) of a breaker. For the sake of this limitation, a more effective short-circuit current breaking technology is desired.

A high-capacity fast switch has been domestically developed early which adopts the combination of an exploding fast breaking current-carrying bridge with a high-voltage current limiting fuse and a zinc oxide resistor having a high energy absorption capacity and which can be switched on/off at the beginning of the rise of a short-circuit current to limit the rise of the short-circuit current and cut off the short-circuit current within 1 ms when the short-circuit current is approximate to 15% of a peak value to avoid the impact caused by a large short-circuit current on an electric device, Although featured by a large rated current (6 kA), a short breaking time (below 3 ms), a high breaking capacity (160 kA) and a high voltage resistance (36 kV) of break, the high-capacity fast switch has defects in use, the removal of a faulted line after switching off the high-capacity fast switch causes potential safety hazards to the stable running of some loads which cannot be powered off, besides, the high-capacity fast switch can only be installed indoor. At present, all the domestic solutions to the loss and the voltage reduction caused during the running of a current limiting reactor are connecting a high-capacity fast switch with two ends of the current limiting reactor in parallel through a switch cabinet, the control over the high-capacity fast switch is realized at a secondary side, a control signal is activated by a triggering signal sent by an insulating transformer, and a control loop is powered by the power system of a 380V transformer substation. Limited by an insulation level, most high-capacity fast switches are used in a 6-35 kV high voltage chamber, and the high-capacity fast switches having many operational links, which are limited by many conditions, cannot be installed or used conveniently and are increased in the length of connecting bus bars, are more likely to malfunction and have more risks.

The short-circuit current of a power grid of 500 kV or below is usually limited at home and aboard using a power electronic technology which costs 10 times as much as domestic devices in construction and occupies a large floor area but cannot achieve a high operational reliability.

Figure 1:
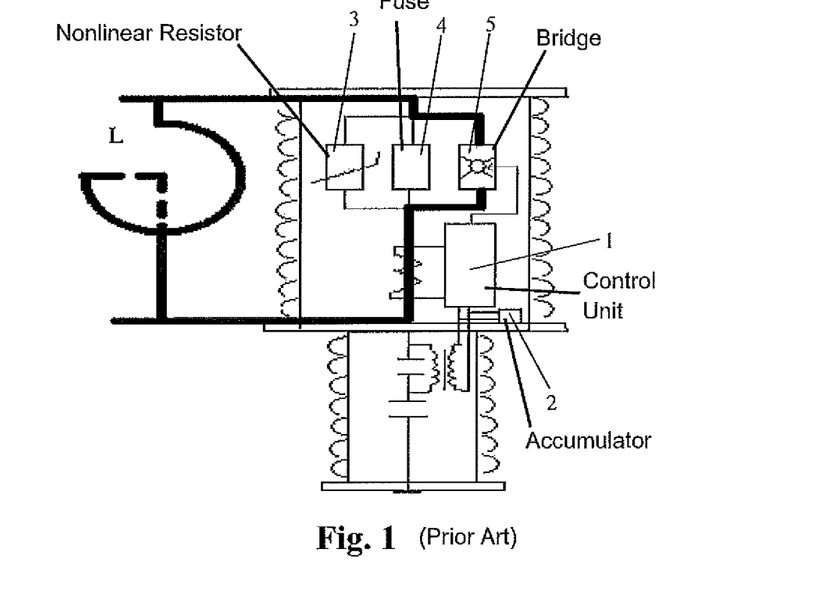
FIG. 1 is a diagram illustrating the structure of an energy-saving current limiting device for a power grid provided in the prior art.

An 'energy-saving current limiting device for a power grid' was successfully developed in 2008 by Electric Power Research Institute of Ningxia, People's Republic of China, in cooperation with Kaili Group-Anhui Zhongxin Electric Power Technology Co., Ltd based on the concept of forming an integrated energy-saving current limiting device for a power grid by connecting a high-capacity fast switch with a current limiting reactor in parallel at a primary high-voltage side of a power grid put forward by Electric Power Research Institute of Ningxia in combination with the technical principle, structural parameters of product and technical parameters proposed by Electric Power Research Institute of Ningxia; as shown in FIG. 1 in which reference numeral 1 represents a control unit, reference numeral 2 represents an accumulator, reference numeral 3 represents a nonlinear resistor, reference numeral 4 represents a fuse, and reference numeral 5 represents a bridge, the bridge 5, the fuse 4 and the nonlinear resistor 3 of the current limiting device for a power grid are installed in a composite insulating sleeve, an inverted capacitor type voltage divider which also functions as an insulating support directly obtains the working power of a control system at the primary high-voltage side of the power grid so that the device is measured and controlled fully automatically and a plurality of parameters are intelligently determined fully automatically, thus, the application of the high-capacity fast switch is substantially improved; when used in a medium-voltage system (35 kV) of a 220 kV transformer substation in Ningxia, the energy-saving current limiting device for a power grid acts correctly in the case of a 35 kV short-line short-circuit fault, protecting a main transformer and other devices from being damaged by a too large short-circuit current and guaranteeing the safe and stable running of the system. However, after the high-capacity fast switch exploding bridge in the energy-saving current limiting device for a power grid is broken, power needs to be cut off for element replacement, thus causing a problem that the power grid is not high in operational reliability.

No effective solutions have been proposed to address the problem existing in the prior art that a power grid is not high in operational reliability.

SUMMARY OF THE INVENTION

The disclosure is mainly intended to provide a current limiting device, a current limiter and a current limiting system for a power grid so as to address the problem existing in the prior art that the operational reliability of a power grid is not high.

To realize the purpose above, in accordance with an aspect of the disclosure, a current limiting device for a power grid is provided, including:
  a first current limiting reactor; a first smart fast switch connected with the first current limiting reactor in parallel; a current transformer sleeved on a bus bar located on one side of a circuit resulting from the parallel connection of the first current limiting reactor with the first smart fast switch, configured to monitor the current in the bus bar in real time; and a controller connected with the current transformer, configured to control the switch-off of the first smart fast switch when the current in the bus bar is higher than a first preset value and the switch-on of the first smart fast switch when the current in the bus bar is smaller than a second preset value, wherein the first preset value is higher than the second preset value.
Further, the device also includes:
  a first contactor connected with the first smart fast switch in parallel, wherein the controller is further configured to detect the state of the first smart fast switch and control the closing of the first contactor when the first smart fast switch rejects to act.
Further, the device also includes:
  an alarm circuit connected with the controller, configured to give an alarm when the first smart fast switch rejects to act.

Further, the device also includes:
a capacitor type voltage transformer the first end of which is connected with a first end of a circuit resulting from the parallel connection of the first contactor, the first current limiting reactor and the first smart fast switch and the output end of which is connected with the power supply circuit of the controller, configured to supply power for the controller.

Further, the output end of the capacitor type voltage transformer is connected with the power supply circuit of the controller by an isolating transformer.

Further, the device also includes:
a second current limiting reactor; a second smart fast switch connected with the second current limiting reactor in parallel; and a second contactor connected with the second smart fast switch in parallel, wherein one end of a circuit resulting from the parallel connection of the second current limiting reactor, the second smart fast switch and the second contactor is connected with the first end of the capacitor type voltage transformer, the second smart fast switch has the same state with the first smart fast switch, and the second contactor has the same state with the first contactor.

Further, the device also includes:
an accumulator connected with the power supply circuit of the controller, configured to supply backup power for the controller.

To realize the purpose above, in accordance with another aspect of the disclosure, a current limiter for a power grid is provided which consists of a plurality of the foregoing devices in serial connection.

To realize the purpose above, in accordance with still another aspect of the disclosure, a current limiting system for a power grid is provided, including: the foregoing current limiting device for a power grid; and a control substation configured to control the current limiting device for a power grid using the optical fiber in an optical fiber insulator.

Further, a plurality of the current limiting devices for a power grid are configured and connected in series.

In the disclosure, a first current limiting reactor is connected into a circuit in a serial connection manner by switching off a first smart fast switch to limit a current and short-circuited by switching on the first smart fast switch when a fault is eliminated so that the current limiting device for a power grid can resume the normal running of a power grid while running normally and nondestructively, requiring no power cutoff for element replacement, thus improving the operational reliability of the power grid.

DESCRIPTION OF THE DRAWINGS

The accompanying drawings described here are provided for a better understanding of the disclosure and constitute one part of the disclosure, and the exemplary embodiments of the disclosure and description thereof are illustrative of the disclosure but are not to be construed as limiting the disclosure. In the accompanying drawings.

DETAILED DESCRIPTION OF THE INVENTION

It should be noted that embodiments of the disclosure and the features thereof can be combined with each other if no conflict is caused. The disclosure is described below in detail with reference to accompanying drawings when read in conjunction with embodiments.

Figure 2:
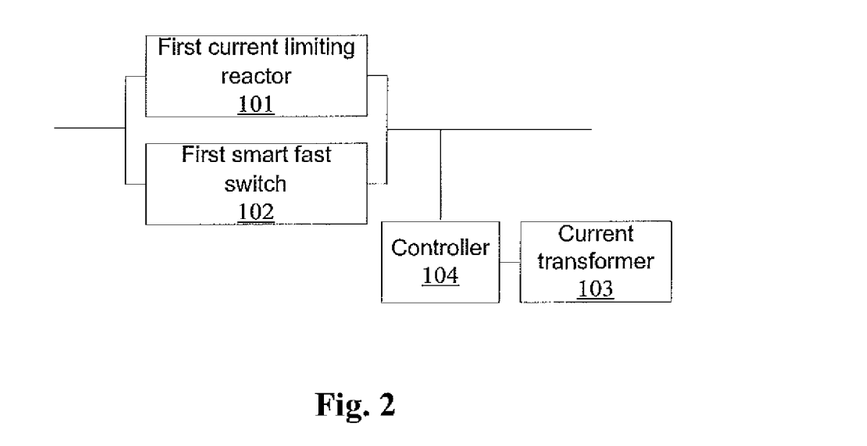
FIG. 2 is a diagram illustrating the structure of a current limiting device for a power grid according to embodiment 1 of the disclosure.

FIG. 2 is a diagram illustrating the structure of a current limiting device for a power grid according to an embodiment of the disclosure, and as shown in FIG. 2, the current limiting device for a power grid provided in the embodiment includes:
a first current limiting reactor 101,
    preferably, the first current limiting reactor is a hollow current limiting reactor;
a first smart fast switch 102 connected with the first current limiting reactor 101 in parallel;
a current transformer 103 sleeved on a bus bar located on one side of a circuit resulting from the parallel connection of the first current limiting reactor 101 with the first smart fast switch 102 so as to monitor the current in the bus bar in real time;
for example, the current transformer, which may be a line-special Current Transformer (CT), is a hardware condition for the realization of a quick short-circuit current determination;
and a controller 104 connected with the current transformer 103 to control the switch-off of the first smart fast switch 102 when the current in the bus bar is greater than a first preset value and the switch-on of the first smart fast switch 102 when the current in the bus bar is smaller than a second preset value, wherein the first preset value is greater than the second preset value.

For example, the first preset value may be 7 times as much as the rated current of the bus bar, and the second preset value may be 1.2 times as much as the rated current of the bus bar.

In the disclosure, a current limit effect is realized by limiting a current using a short circuit; under normal circumstances, the first smart fast switch is switched on and the first current limiting reactor is short-circuited, thus, a current only flows through the first smart fast switch, the impedance is zero, and no loss is caused; in the case of a short-circuit fault, the current increases instantly, the increase is monitored by the current transformer and reported to the controller, the controller instructs the first smart fast switch to be off after determining that the current is higher than the first preset value, then the first smart fast switch is switched off within 15 ms to activate the first current limiting reactor to limit the current, the short-circuit current can be limited to be reduced by more than 20%; after the short-circuit fault is eliminated, the controller monitors the current using the current transformer and, after finding that the current is below the second preset value, sends a switch-on instruction to the first smart fast switch, and the current limiting device for a power grid enters a normal nondestructive running state after the first smart fast switch is switched on.

With the use of the current limiting device for a power grid provided herein, the first current limiting reactor is connected into a circuit in a serial connection manner by switching off the first smart fast switch to limit a current and short-circuited by switching on the first smart fast switch when a fault is eliminated so that the current limiting device for a power grid can resume the normal running of a power grid while running normally and nondestructively, requiring no power cutoff for element replacement, thus improving the operational reliability of the power grid.

Figure 3:
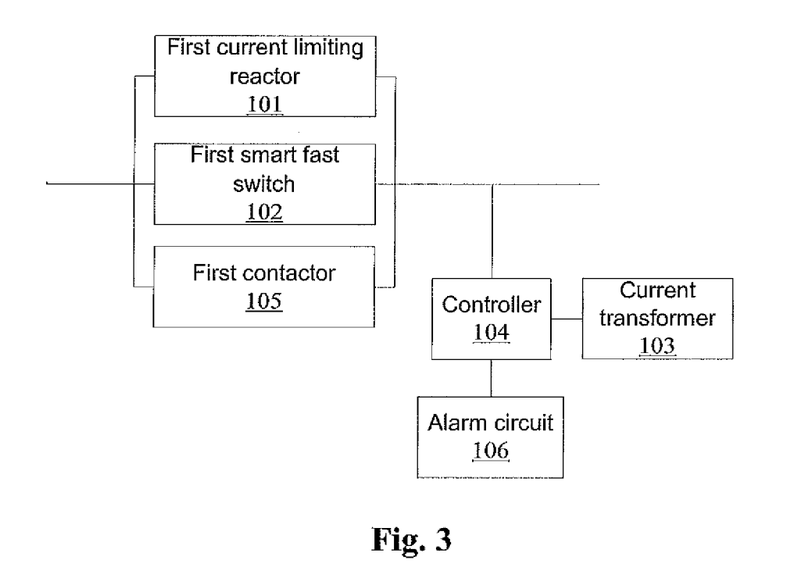
FIG. 3 is a diagram illustrating the structure of a current limiting device for a power grid according to embodiment 2 of the disclosure.

Preferably, FIG. 3 is a diagram illustrating the structure of a current limiting device for a power grid according to an embodiment of the disclosure, and as shown in FIG. 3, the current limiting device for a power grid includes:
  a first current limiting reactor 101;
  a first smart fast switch 102 connected with the first current limiting reactor 101 in parallel;
  a current transformer 103 sleeved on a bus bar located on one side of a circuit resulting from the parallel connection of the first current limiting reactor 101 with the first smart fast switch 102 so as to monitor the current in the bus bar in real time;
  a first contactor 105 connected with the first smart fast switch 102 in parallel;
  the first contactor may be a high-voltage vacuum contactor; and
  a controller 104 connected with the current transformer 103 to control the switch-off of the first smart fast switch 102 when the current in the bus bar is greater than a first preset value and the switch-on of the first smart fast switch 102 when the current in the bus bar is smaller than a second preset value, wherein the first preset value is greater than the second preset value; the controller is further configured to detect the state of the first smart fast switch 102 and control the closing of the first contactor 105 when the first smart fast switch 102 rejects to act;
  to exclude the problems that the current limiting reactor is driven to run by a line resulting from the rejection of the first smart fast switch to act and that the device is powered off for maintenance, the first contactor may be connected with two ends of the first smart fast switch in parallel to be adaptive to the running mode of the power grid, and the controller sends a signal to the first contactor to switch on the contactor after detecting the rejection of the first smart fast switch to act, thereby stopping the running of the current limiting device for a power grid; and
  an alarm circuit 106 connected with the controller 104 to give an alarm when the first smart fast switch 102 rejects to act.

The running of the current limiting device for a power grid provided in the embodiment is stopped by closing the first contactor when the first smart fast switch is faulted, thus eliminating the influence caused by the failure of the current limiting device for a power grid on the power grid and consequentially improving the operational reliability of the power grid.

Figure 4:
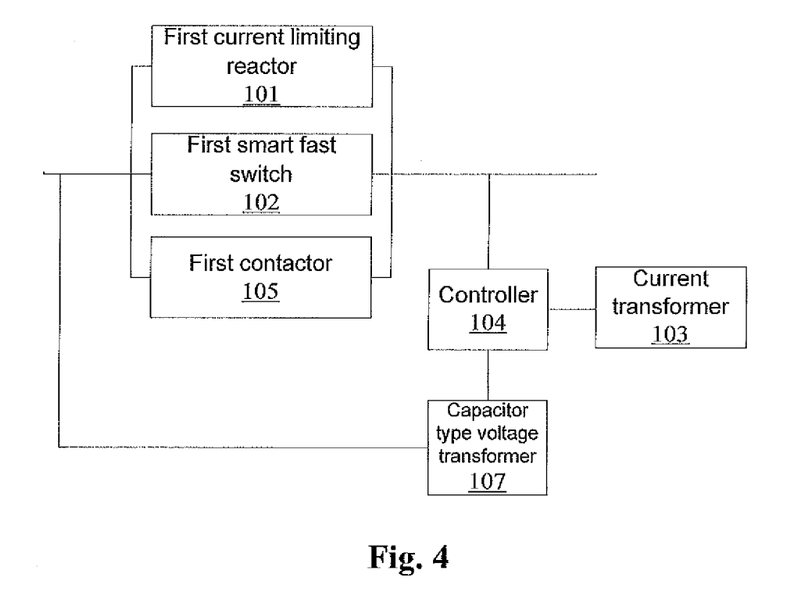
FIG. 4 is a diagram illustrating the structure of a current limiting device for a power grid according to embodiment 3 of the disclosure.

Preferably, FIG. 4 is a diagram illustrating the structure of a current limiting device for a power grid according to an embodiment of the disclosure, and as shown in FIG. 4, the current limiting device for a power grid provided in the embodiment includes:
  a first current limiting reactor 101;
  a first smart fast switch 102 connected with the first current limiting reactor 101 in parallel;
  a current transformer 103 sleeved on a bus bar located on one side of a circuit resulting from the parallel connection of the first current limiting reactor 101 with the first smart fast switch 102 so as to monitor the current in the bus bar in real time.
  a first contactor 105 connected with the first smart fast switch 102 in parallel;
  a controller 104 connected with the current transformer 103 to control the switch-off of the first smart fast switch 102 when the current in the bus bar is greater than a first preset value and the switch-on of the first smart fast switch 102 when the current in the bus bar is smaller than a second preset value, wherein the first preset value is greater than the second preset value; the controller is further configured to detect the state of the first smart fast switch 102 and control the closing of the first contactor 105 when the first smart fast switch 102 rejects to act; and
  a capacitor type voltage transformer 107, the first end of which is connected with a first end of a circuit resulting from the parallel connection of the first contactor 105, the first current limiting reactor 101 and the first smart fast switch 102 and the output end of which is connected with the power supply circuit of the controller 104 to supply power for the controller 104.

Preferably, the output end of the capacitor type voltage transformer 107 is connected with the power supply circuit of the controller 104 by an isolating transformer.

The capacitor type voltage transformer includes a voltage dividing capacitor and a high voltage coupling capacitor, wherein the isolating transformer obtains power from two ends of the voltage dividing capacitor and transfers the power to the controller, and the controller, after determining that it is electrified normally, starts a control program.

Figure 5:
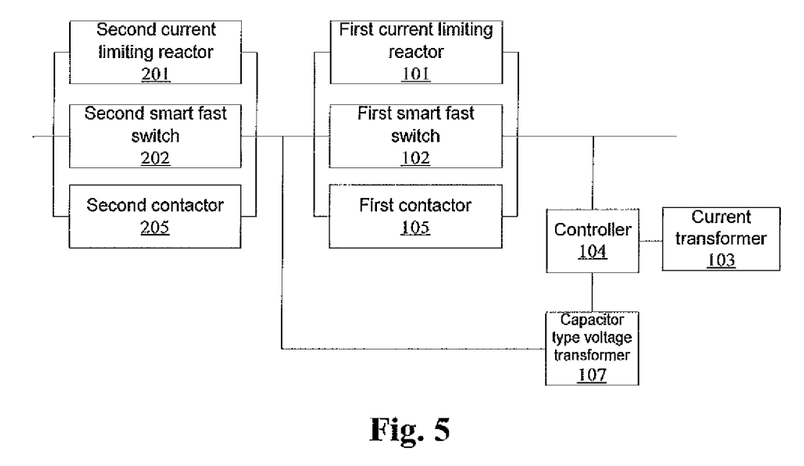
FIG. 5 is a diagram illustrating the structure of a current limiting device for a power grid according to embodiment 4 of the disclosure.

Preferably, FIG. 5 is a diagram illustrating the structure of a current limiting device for a power grid according to an embodiment of the disclosure, and as shown in FIG. 5, the current limiting device for a power grid includes:
  a first current limiting reactor 101;
  a first smart fast switch 102 connected with the first current limiting reactor 101 in parallel;
  a current transformer 103 sleeved on a bus bar located on one side of a circuit resulting from the parallel connection of the first current limiting reactor 101 with the first smart fast switch 102 so as to monitor the current in the bus bar in real time;
  a first contactor 105 connected with the first smart fast switch 102 in parallel;
  a controller 104 connected with the current transformer 103 to control the switch-off of the first smart fast switch 102 when the current in the bus bar is greater than a first preset value and the switch-on of the first smart fast switch 102 when the current in the bus bar is smaller than a second preset value, wherein the first preset value is greater than the second preset value; the controller is further configured to detect the state of the first smart fast switch 102 and control the closing of the first contactor 105 when the first smart fast switch 102 rejects to act;
a capacitor type voltage transformer 107, the first end of which is connected with a first end of a circuit resulting from the parallel connection of the first contactor 105, the first current limiting reactor 101 and the first smart fast switch 102 and the output end of which is connected with the power supply circuit of the controller 104 to supply power for the controller 104;
a second current limiting reactor 201;
a second smart fast switch 202 connected with the second current limiting reactor 201 in parallel; and
a second contactor 205 connected with the second smart fast switch 202 in parallel,
wherein one end of a circuit resulting from the parallel connection of the second current limiting reactor 201, the second smart fast switch 202 and the second contactor 205 is connected with the first end of the capacitor type voltage transformer 107; the second smart fast switch 202 has the same state with the first smart fast switch 102; and the second contactor 205 has the same state with the first contactor 105.

Further, the device also includes:
an accumulator connected with the power supply circuit of the controller to supply backup power for the controller.

Figure 6:
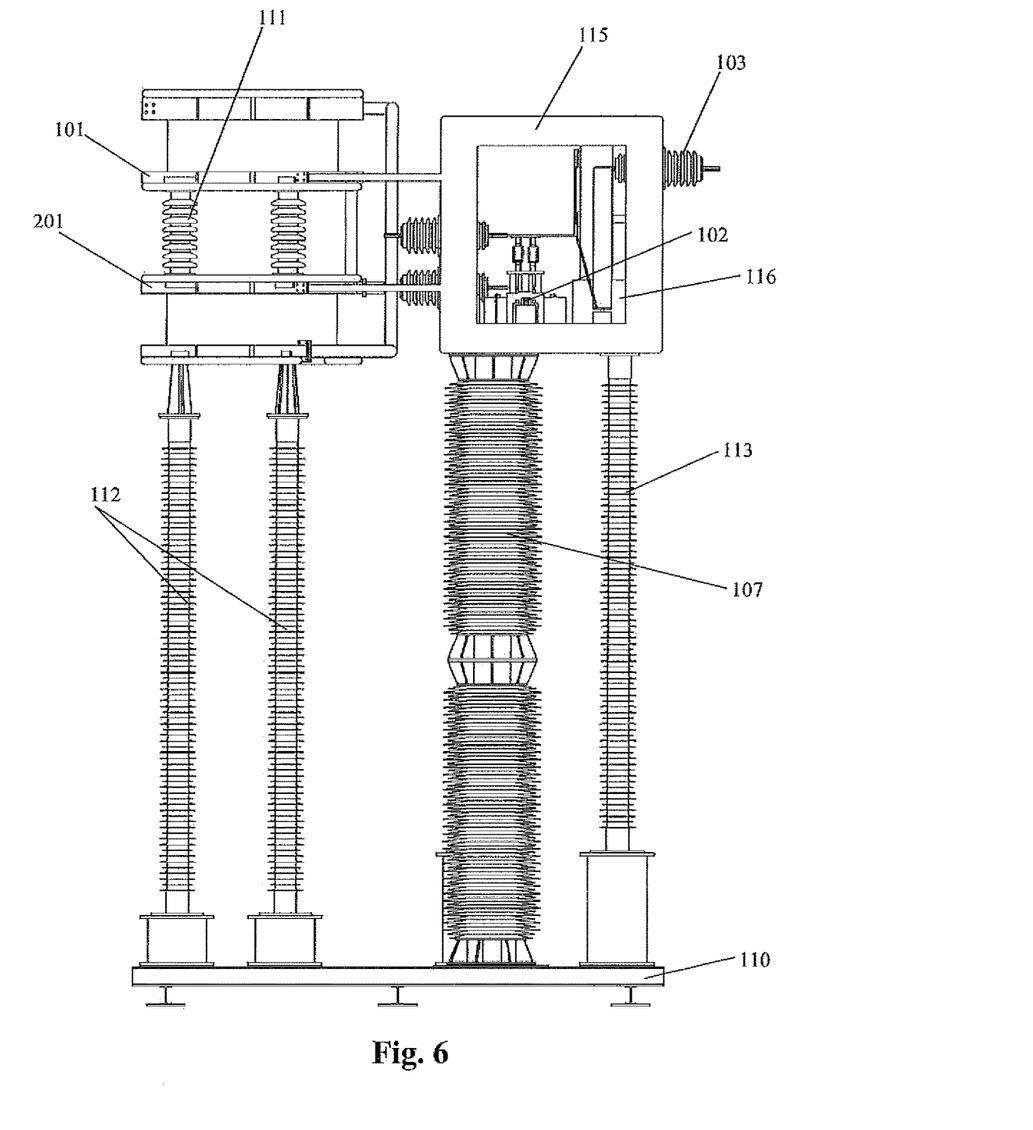
FIG. 6 is a schematic diagram illustrating the structure of a current limiting device for a power grid according to an embodiment of the disclosure.

FIG. 6 is a schematic diagram illustrating the structure of a current limiting device for a power grid provided herein, refer to FIG. 6, the first current limiting reactor 101 and the second current limiting reactor 201 are supported by a supporting insulator 112, preferably, the first current limiting reactor 101 and the second current limiting reactor 201 are hollow current limiting reactors; the first smart fast switch 102, the second smart fast switch 202 (FIG. 5) and the current transformer 103 are arranged in a current limiting control box 115 in which a device 116 is also arranged, the first contactor 105 (FIG. 5), the second contactor 205 (FIG. 5) and the controller 104 (FIG. 5) are arranged in the device 116; the current limiting control box 115 is supported by the capacitor type voltage transformer 107 and an optical fiber insulator 113; the high-voltage side of the current limiting device for a power grid is immobilized through a hard connection while the low-voltage side thereof immobilizes the supporting insulator 112, the capacitor type voltage transformer 107 and the optical fiber insulator 113 on a plane using a steel frame 110; and the first current limiting reactor 101 is connected with the second current limiting reactor 201 by an insulating magnetic support 111 on the high-voltage platform of the device so as to ensure that the coefficient of mutual induction is equal to or smaller than 3%; the first current limiting reactor 101, the first smart fast switch 102 and the first contactor 105 are connected in parallel; the second current limiting reactor 201, the second smart fast switch 202 and the second contactor 205 are connected in parallel; moreover, the power of the controller 104 is supplied by the inversed capacitor type voltage transformer 107; and the communication between the controller 104 and a control substation is realized by the optical fiber in the optical fiber insulator 113.

Figure 7:
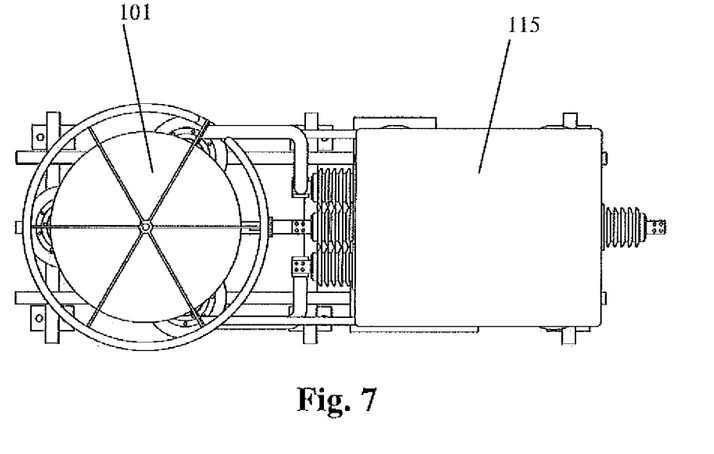
FIG. 7 is a top view of the current limiting device for a power grid shown in FIG. 6.

FIG. 7 is top view of the current limiting device for a power grid show in FIG. 6, refer to FIG. 7, reference numeral 101 represents the first current limiting reactor which may be a hollow cylindrical current limiting reactor, and reference numeral 115 represents a current limiting control box with which the first current limiting reactor is connected.

By limiting a current using two current limiting reactors when a short-circuit fault occurs in a power grid, the current limiting device for a power grid provided in the embodiment of the disclosure is improved in current limiting performance and consequentially enhances the operational reliability of the power grid.

Figure 8:
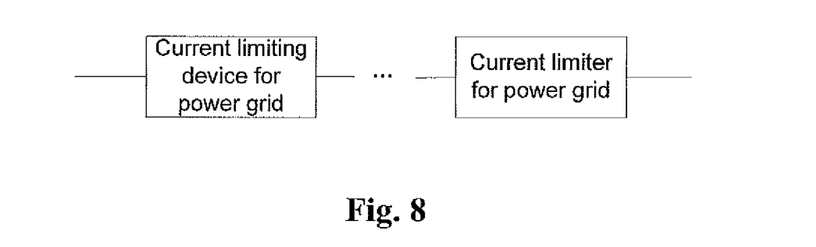
FIG. 8 is a diagram illustrating the structure of a current limiter for a power grid according to an embodiment of the disclosure.

FIG. 8 is a diagram illustrating the structure of a current limiter for a power grid according to an embodiment of the disclosure, the current limiter for a power grid consisting of a plurality of the foregoing current limiting devices for a power grid in serial connection.

The current limiter for a power grid provided in the embodiment of the disclosure, which may consist of a plurality of current limiting devices for a power grid in serial connection, depending upon the current limit effect required, can guarantee, as long as one current limiting device for a power grid acts correctly, the safe action of the following current limiting device for a power grid and correspondingly reduces, as each current limiting device acts, the amplitude of a short-circuit current for the on/off of the following current limiting device. For example, the current limiter for a power grid may consist of four current limiting devices for a power grid in serial connection.

The current limiter for a power grid provided herein consisting of a plurality of the foregoing current limiting devices for a power grid in serial connection can resume the normal running of a power grid without cutting off power for element replacement after a short-circuit fault is eliminated, moreover, by connecting a plurality of current limiting devices for a power grid in series, the current limiter for a power grid provided herein is further improved in current limiting performance and enhances the operational reliability of the power grid.

Figure 9:
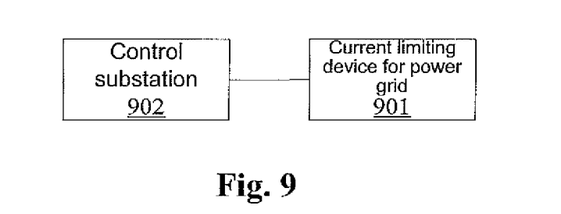
FIG. 9 is a diagram illustrating the structure of a current limiting system for a power grid according to an embodiment of the disclosure.

FIG. 9 is a current limiting system for a power grid according to an embodiment of the disclosure, wherein the current limiting system for a power grid includes the foregoing current limiting device 901 for a power grid and a control substation 902 connected with the current limiting device 901 for a power grid.

The control substation 902 can receive a current value sent from the current limiting device 901 for a power grid, the state of the smart fast switch and the supply voltage of the controller and displays the received values on the panel of the control substation, moreover, when the smart fast switch rejects to act, the control substation can give an alarm to prompt the rejection of the smart fast switch to act.

Figure 10:
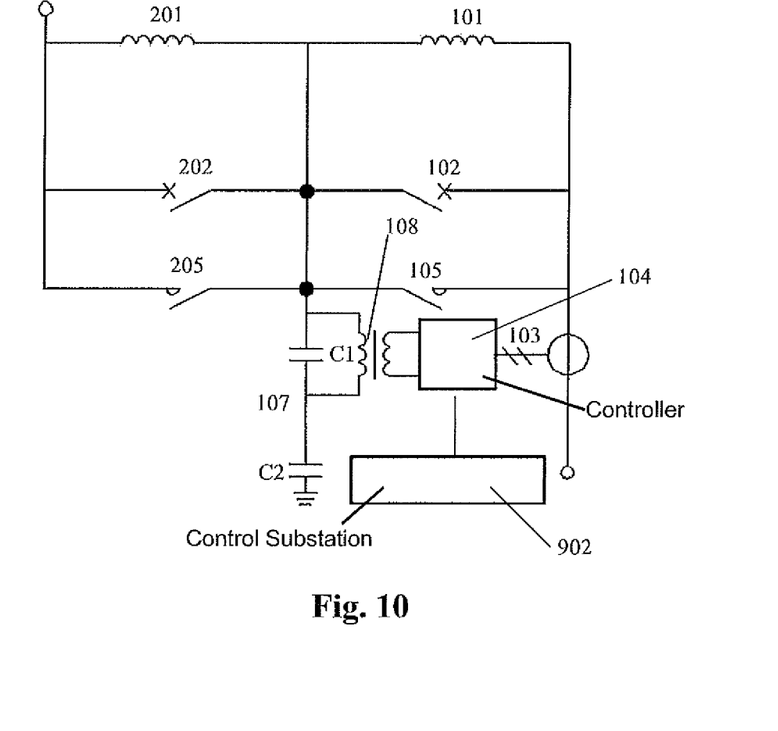
FIG. 10 is a diagram illustrating the structure of another current limiting system for a power grid according to an embodiment of the disclosure.

FIG. 10 is a current limiting system for a power grid according to an embodiment of the disclosure, refer to FIG. 10, reference numeral 101 represents a first current limiting reactor, 201 represents a second current limiting reactor, 102 represents a first smart fast switch, 202 represents a second smart fast switch, 105 represents a first contactor, 205 represents a second contactor, 104 represents a controller, 103 represents a current transformer, 107 represents a capacitor type voltage transformer which includes a voltage dividing capacitor C1 and a high voltage coupling capacitor C2, 108 represents an insulating transformer, and 902 represents a control substation; before the current limiting system for a power grid is put into operation, the first smart fast switch 102, the second smart fast switch 202, the first contactor 105 and the second contactor 205 are all in a switched-on state, and the first current limiting reactor 101 and the second current limiting reactor 201 are both in a short-circuited state. After the current limiting device for a power grid runs on a power grid, the insulating transformer 108 obtains power from two ends of the voltage dividing capacitor C1 of the capacitor type voltage transformer 107 and transfers the power to the controller 104; the controller 104, after determining that it is normally electrified, starts a control program; after energy-accumulating power supplies of the first contactor 105 and the second contactor 205 are fully charged, the controller 104 sends a signal to break the first contactor 105 and the second contactor 205 while sending the states of the first smart fast switch 102, the second smart fast switch 202, the first contactor 105 and the second contactor 205 to the distant control substation 902, at this time, the current limiting device for a power grid is in a normal running state in which the first smart fast switch 102 and the second smart fast switch 202 are connected with the first current limiting reactor 101 and the second current limiting reactor 201 in parallel, as the impedance of the first smart fast switch 102 and the second smart fast switch 202 is zero, the flow of the current in the circuit causes no loss, besides, as the first current limiting reactor 101 and the second current limiting reactor 201 are short-circuited by the first smart fast switch 102 and the second smart fast switch 202, respectively, no loss is caused, thus, the device is in a nondestructive running state. By monitoring the real-time line current in a bus bar using the current transformer 103, the controller 104 controls, in the case of a short-circuit fault, the first smart fast switch 102 and the second smart fast switch 202 to be switched off within 15 ms after determining that a short-circuit current reaches a first preset value so that the first current limiting reactor 101 and the second current limiting reactor 201 are connected into a 330 kV electric transmission line in a serial connection manner to limit the short-circuit current of the power grid, at the same time, the controller 104 sends the value of the short-circuit current (the waveform of the whole process) and the states of the first smart fast switch 102 and the second smart fast switch 202 to the distant control substation 902 through optical fibers; after monitoring the elimination of the short-circuit current fault of the line, the controller determines whether or not the current is smaller than a second preset value and if so, the controller 104 sends a signal to switch on the first smart fast switch 102 and the second smart fast switch 202 so that the current limiting device for a power grid enters a normal nondestructive running state, meanwhile, the states of the first smart fast switch 102 and the second smart fast switch 202 are transmitted to the distant control substation 902 through optical fibers, if the switch-off of the switches is rejected, then the controller 104 sends a signal to switch on the first contactor 105 and the second contactor 205 to stop the running of the current limiting device for a power grid, in this case, the normal running of the line is not affected and the device no longer has a current limit effect; the first smart fast switch 102 and the second smart fast switch 202 are reset, adjusted or the like through the distant control substation 902 while the contactor is kept switched on; if the resetting cannot be carried out, then the first smart fast switch 102 and the second smart fast switch 202 will be restored in the next line maintenance.

Further, a plurality of the current limiting devices for a power grid are configured and connected in series.

In embodiments of the disclosure, the short-circuit current of a power grid of 500 kV or below is limited using a current limiting unit, and the current limiting units can be connected in series, like building blocks, so as to meet the requirements on different levels of current limit. Thus, the disclosure limits the short-circuit current of a power grid of 330 (500) kV economically and effectively.

The smart fast switch (or called intelligent high-speed high-capacity vacuum breaker) involved in embodiments of the disclosure is a high-capacity vacuum breaker which is capable of automatically determining the zero crossing point of a short-circuit current and broken at the zero crossing point of the short-circuit current. The vacuum breaker is closed or broken within 15 ms.

In embodiments of the disclosure, whether or not a short-circuit current is beyond a limit is determined and a smart fast switch is switched on or off at the zero crossing point of each phase current using a fast short-circuit current recognition and phase control method.

With the current limiting system for a power grid provided herein, a current limiting reactor is connected into a circuit in a serial connection manner by switching off a smart fast switch to limit a current and short-circuited by switching on the smart fast switch when a fault is eliminated so that the current limiting device for a power grid can resume the normal running of a power grid while running normally and nondestructively, requiring no power cutoff for element replacement, thus improving the operational reliability of the power grid.

The disclosure improves the operational reliability of a power grid, and when used in a serial connection manner, the current limiting devices for a power grid economically and effectively limit the level of the short-circuit current of a power grid of 330 (500) kV or below.

The mentioned above is only preferred embodiments of the disclosure but not limitation to the disclosure, it should be appreciated that various modification and variations can be devised by those of ordinary skill in the art. Any modification, substitute or improvement devised without departing from the spirit and scope of the disclosure should fall within the protection range of the disclosure.

What is claimed is:

1. A current limiting device for a power grid, comprising:
a first current limiting reactor;
a first smart fast switch connected with the first current limiting reactor in parallel;
a current transformer sleeved on a bus bar located on one side of a circuit resulting from the parallel connection of the first current limiting reactor with the first smart fast switch, configured to monitor a current in the bus bar in real time; and
a controller connected with the current transformer, configured to control a switch-off of the first smart fast switch when the current in the bus bar is greater than a first preset value and a switch-on of the first smart fast switch when the current in the bus bar is smaller than a second preset value, wherein the first preset value is greater than the second preset value;
a first contactor connected with the first smart fast switch in parallel, wherein the controller is configured to detect a state of the first smart fast switch and control a closing of the first contactor when the first smart fast switch rejects to act.

2. The device according to claim 1, further comprising:
an alarm circuit connected with the controller, configured to give an alarm when the first smart fast switch rejects to act.

3. The device according to claim 1, further comprising:
a capacitor type voltage transformer, a first end of which is connected with a first end of a circuit resulting from the parallel connection of the first contactor, the first current limiting reactor and the first smart fast switch and an output end of the capacitor type voltage transformer is connected with a power supply circuit of the controller, configured to supply power for the controller.

4. The device according to claim 3, wherein the output end of the capacitor type voltage transformer is connected with the power supply circuit of the controller by an isolating transformer.

5. The device according to claim 3, further comprising:
a second current limiting reactor;
a second smart fast switch connected with the second current limiting reactor in parallel; and
a second contactor connected with the second smart fast switch in parallel,
wherein one end of a circuit resulting from the parallel connection of the second current limiting reactor, the second smart fast switch and the second contactor is connected with a first end of the capacitor type voltage transformer, the second smart fast switch has the same state with the first smart fast switch, and the second contactor has the same state with the first contactor.

6. The device according to claim 1, further comprising:
an accumulator connected with a power supply circuit of the controller, configured to supply backup power for the controller.

7. A current limiter for a power grid consisting of a plurality of devices in serial connection, any one of the devices is the device of claim 1 in serial connection.

8. A current limiting system for a power grid, comprising:
the current limiting device for a power grid of claim 1, and
a control substation connected with the current limiting device for a power grid.

9. The system according to claim 8, wherein a plurality of current limiting devices are configured and connected in series.

* * * * *

UNITED STATES PATENT AND TRADEMARK OFFICE
CERTIFICATE OF CORRECTION

PATENT NO. : 9,640,984 B2
APPLICATION NO. : 14/441918
DATED : May 2, 2017
INVENTOR(S) : Shaogui Al et al.

Page 1 of 1

It is certified that error appears in the above-identified patent and that said Letters Patent is hereby corrected as shown below:

On the Title Page

Please add Assignee STATE GRID CORPORATION OF CHINA residing in BEIJING, CHINA

Signed and Sealed this
Fifteenth Day of May, 2018

Andrei Iancu
*Director of the United States Patent and Trademark Office*